3,105,801
PROCESS FOR POLYMERIZING UNSATURATED ALDEHYDES USING IONIZING RADIATION AND RESULTING POLYMERS
Edward R. Bell, Concord, Vincent A. Capanile, Moraga, and Elliot Bergman, Berkeley, Calif., assignors to Shell Oil Company, New York, N.Y., a corporation of Delaware
No Drawing. Filed Oct. 21, 1960, Ser. No. 63,987
14 Claims. (Cl. 204—154)

This invention relates to the polymerization of unsaturated aldehydes. More particularly, the invention relates to a new process for polymerizing ethylenically unsaturated aldehydes using high energy ionizing radiation, to the high molecular weight polymers prepared thereby and to the utilization of the polymers.

Specifically, the invention provides a new and highly efficient process for preparing high molecular weight polymers of ethylenically unsaturated aldehydes, such as acrolein, which are water-insoluble but are soluble in aqueous $SO_2$ or sodium bisulfite. This process comprises adding a small amount of acid or acid-acting material to an aqueous solution containing the ethylenically unsaturated aldehyde and exposing the resulting mixture to high energy ionizing radiation, such as, for example, a high energy stream of electrons or photons.

It is known that acrolein can be polymerized to high molecular weight insoluble polymers by redox polymerization techniques employing potassium persulfate and metal salts such as iron sulfate or silver chloride. These polymers can be converted to a useful soluble form by treatment with $SO_2$. These polymers, however, are discolored due to the presence of the metals, such as iron, which are difficult to remove. In addition, the rates of conversion of monomer to polymer are low and the acrolein polymers obtained by this method do not have as high molecular weight as desired for many applications.

Attempts have been made to correct some of these difficulties by use of other types of polymerization techniques. Such attempts, however, have not proved satisfactory heretofore, as the products were generally of low molecular weight and the products did not readily dissolve in aqueous $SO_2$ or sodium bisulfite.

It is an object of the invention, therefore, to provide a new process for polymerizing unsaturated aldehydes, such as acrolein. It is a further object to provide a process for converting unsaturated aldehydes to polymers having high molecular weights. It is a further object to provide a method for converting unsaturated aldehydes to polymers which are readily soluble in aqueous $SO_2$ and aqueous Na bisulfite. It is a further object to provide a method for preparing polymers of unsaturated aldehydes which are substantially colorless. It is a further object to provide a process for polymerizing unsaturated aldehydes which effects a high conversion of monomer to polymer. It is a further object to provide a polymerization process for unsaturated aldehydes that can be easily controlled to give desired type of products. It is a further object to provide high molecular weight substantially colorless polymers of unsaturated aldehydes and useful derivatives thereof. These and other objects and advantages of the invention will be apparent from the following detailed description thereof.

It has now been discovered that these and other objects may be accomplished by the process of the invention comprising adding a small amount of an acid or acid-acting material to an aqueous solution containing the unsaturated aldehyde and exposing the acidic medium to high energy ionizing radiation, such as, for example, a high energy stream of electrons or photons. It has been surprisingly found that the polymers obtained by this special technique have high molecular weights. Polymers prepared by this method, for example, preferably have intrinsic viscosities of at least 0.3 and preferably 0.9 to 3. In addition, the polymers are white powders free of discoloration as present in the prior known products. Further, the new polymers have surprisingly good solubility in aqueous $SO_2$ solutions and in alkali and react therewith to form derivatives which are particularly useful and valuable in industry, especially for the treatment of paper, cloth, fibers and the like. The new process is also characterized by the fact that it permits very high conversion of monomer to polymer and gives a polymer which is a free flowing powder which has excellent workability.

The alpha,beta-ethylenically unsaturated aldehydes used in the process comprise those aldehydes having an ethylenic group in an alpha-beta-position relative to the aldehyde group, such as, for example, acrolein and alpha and beta-substituted acroleins, as methacrolein, alpha-ethylacrolein, alpha-butylacrolein, alpha-chloroacrolein, beta-phenylacrolein, alpha-decylacrolein, alpha-cyclohexylacrolein and the like. Preferred aldehydes to be employed in making the polymers include the alpha,beta-monoethylenically unsaturated monoaldehydes containing from 3 to 12 carbon atoms, and especialy acrolein and the alpha- and beta-substituted acroleins where the stubstituent on the alpha and/or beta positions is an alkyl, cycloalkyl or aryl group containing no more than 8 carbon atoms. 2-alkenals containing up to 8 carbon atoms come under special consideration because of the superior results obtained in the process.

The process of the invention is applicable to the homopolymerization or copolymerization of two or more of the above-described aldehydes as well as to the copolymerization of the above-described aldehydes with other ethylenically unsaturated monomers, and particularly those having a terminal $CH_2=C=$ group. Examples of such other monomers include, among others, butadiene, isoprene, methylpentadiene, ethylene, propylene, styrene, alpha-methylstyrene, vinylpyridine, vinyl pyrrolidone, allyl alcohol, acrylic and methacrylic acids and esters, vinyl acetate, allyl esters of monocarboxylic acids, vinyl halides, acrylonitrile, methacrylonitrile and the like. These monomers are preferably employed in amounts varying from about 0.1% to 60%, and more preferably from 1% to 25% by weight of the monomer mixture.

The polymerization is carried out in an acidic aqueous medium. The aqueous medium must be acidic in order to obtain the above-noted superior results. This acidity may be obtained by adding acids or acid-acting materials to the water solution. The acids employed may be inorganic or organic acids, but are preferably acids having a strength greater than acetic acid, and preferably an acidity of at least that of p-toluene-sulfonic acid. Examples of acids that may be used include, among others, sulfuric acid, phosphoric acid, nitric acid, hydrochloric acid, p-toluene-sulfonic acid and the like.

The acids are preferably used in concentrations varying from about .001% to about 20%. In most cases, desired results are obtained by the use of only very small amounts of acids, e.g., concentrations of .001% to 2%, and such are the preferred amounts to be used. Preferred pH range for the aqueous medium ranges from 1 to about 5.

The aqueous medium may also contain various types of stabilizing, suspending and emulsifying agents depending on the system desired. It is preferred in most cases to employ a medium containing a small amount of an anti-coalescent agent as the presence of such materials permits the formation of the polymer in final form. The agent may be a cationic, anionic or non-ionic material and have a great variety of different compositions. Preferred materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmtyl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylol propane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bis-phenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nony phenyl polyethylene glycol ether, isopropylphenyl polyethylene glycol monoether and the like.

Especially preferred materials to be used, particularly because of the superior results obtained therewith include the water-soluble agents as polyethylene oxides, condensates of oxides and phenols, polyacrylamides, starch, casein, styrene-maleic anhydride copolymers, methocel and the like.

The amount of the anti-coalescent agent employed in the polymerization process will vary over a considerable range depending upon the unsaturated aldehyde to be polymerized and the particular agent selected. In general, the amount of the agent will vary from about .1% to 80% by weight of the unsaturated aldehyde. Preferred amounts vary from .5% to 25% by weight of the monomer.

Various other materials, such as radiation accelerators as halides, metal salts and the like, may be added to the reaction mixture.

The monomer, water, acid or acid-acting material and other materials such as the anti-coalescent agent may be combined in any order. It is generally preferred to add the unsaturated monomer to the water and then add the desired amount of acid and the anti-coalescent agent.

The total amount of the unsaturated monomer to be added to the aqueous medium may vary over a considerable range depending upon the nature of the various ingredients, solubility of the monomer in water and the like. In most cases, it is preferred to maintain the ratio of the unsaturated aldehyde to water smaller than 1 to 2. When the ratio is larger than 1 to 2, the system sometimes becomes too thick to handle efficiently and it is necessary to add more water for an efficient operation. Preferred ratio of the unsaturated monomer to water in the aqueous system varies between about 1 to 3 and 1 to 8. In the case of acrolein, it is preferred to employ a saturated solution, i.e., about 20% solution.

It is desirable to agitate the aqueous medium during the polymerization. This may be accomplished by use of mechanical stirrers, tumbling of the reaction vessel and the like. Stirring is preferably accomplished at a rate of at least 50 r.p.m. and still more preferably 100 to 200 r.p.m.

The process is also preferably conducted in an inert atmosphere. This may be accomplished by the use of high vacuum or by the use of an inert atmosphere, such as an atmosphere of nitrogen, methane, ethane and the like.

The temperature employed during the polymerization process may vary over a wide range. In general, temperatures range from about −100° C. to 100° C., and more preferably from 10° C. to 80° C. With monomers, such as acrolein, particularly preferred temperatures range from 0° C. to about 50° C.

The process may be conducted at atmospheric, superatmospheric or subatmospheric pressures as desired.

The kind of radiation suitable for use in the present invention includes high energy electrons, protons and photons. Electron beams are suitably produced by electron accelerators such as the Van de Graaff, resonance transformers, and linear accelerators or by a suitable arrangement of certain isotopes, e.g., strontium 90. High energy photons suitable for use are, for example, X-ray produced by conventional X-ray tubes and electron accelerators and gamma rays which may be produced by decay of radioactive material such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, X-rays, fast neutrons and slow neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the paper by Burton et al., Nucleonics, 13 [No. 10–74 (1955)], and references cited therein.

A preferred process comprises exposing the monomer mixture to radiation by passing it through a nuclear reactor which may at the same time be employed for power producing purposes or may be utilized exclusively for polymerization. A suitable reactor is described in substantial detail in the Fermi et al. patent, U.S. 2,708,656.

Preferred ionizing radiation is that which has the power to penetrate to a substantial depth, i.e., at least about 1 centimeter, into a mass of the monomer in condensed phase. This is sometimes referred to herein as radiation of substantial penetrating power. In this operation, the monomer mass is exposed to such radiation from a source which is not finely dispersed within said mass. The radiation may be introduced into the condensed mass, held in a vessel, through a suitable window in the vessel or by placing an intensive source of radiation, such as a canned mass of gamma-ray emitter, into the vessel containing the monomer.

The total dosage employed in the polymerization may vary over a wide range depending on the particular monomer utilized. Preferred total dosage varies from about $10^5$ to $5\times 10^6$ rads; dosages of up to $5\times 10^7$ rads or more, calculated on the total mixture, may be employed if polymer is removed from the irradiation zone after it is formed. A rad is defined as 100 ergs of ionizing energy absorbed per gram of irradiated mixture.

The dosage rate will also vary considerably. Preferred dosage rates vary from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The polymer formed during the process will precipitate out as a white solid and may be recovered by any suitable means, such as filtration, centrifugation and the like. After recovery, it is generally desirable to wash the polymer with water and acetone and then dry the product.

The polymers obtained by the process of the invention are solid substantially white high molecular weight products. They preferably have intrinsic viscosities (as determined on the solubilized form) of at least 0.3 and preferably 0.9 to 3.0. These values are determined by the conventional technique of polyelectrolyte viscosity measurements at 25° C. On a mol weight basis, such polymers preferably have molecular weights ranging from about 100,000 to 2,000,000 as determined by the light scattering technique.

The polymers obtained by the process are characterized by the fact that they possess a high percent of theoretical aldehyde function, i.e., when the polymer is subjected to conventional test for presence of aldehyde groups (e.g., addition of hydroxylamine hydrochloride and titrate liberated water with Karl Fischer reagent) the results show the high percent, i.e., over 95% of the theoretical aldehyde groups present by addition polymerization at the double bonds are present in the polymer as such or in hydrated form. Further analysis has shown that the polymer contains many groups wherein the aldehyde is in a hydrated form as wherein R is hydrogen or hydrocarbon and particularly alkyl, cycloalkyl and aryl radicals containing 1 to 10 carbon atoms. This clearly distinguishes the polymer of the invention from those produced by conventional methods wherein the polymer possesses at most only 60–75% of the theoretical aldehyde function.

The polymers are also characterized by being insoluble in water and conventional solvents, such as benzene, toluene, acetone and the like.

The polymers are also characterized by being reactive with aqueous sulfur dioxide and alkali metal bisulfites and react themselves to form water-soluble derivatives. These water soluble derivatives are preferably prepared by suspending the high molecular weight polymer in an aqueous solution containing the water-solubilizing agents, such as the sulfur dioxide or bisulfite. The amount of polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydrofuran may also be employed in the dissolution.

The water-soluble derivatives prepared as above will have substantially the same molecular weight as the water-insoluble basic polymer. In case of the sulfur dioxide and alkali metal bisulfites, the polymer will also contain a plurality of free sulfonic groups or water-soluble salt sulfonate groups contained in the polymer molecule and, therefore, may be regarded as polymeric polysulfonic acids and polymeric polysulfonate metal salts.

The water-solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater stage or intermittently or at the end of the operation. If the aqueous solution is applied to the finished paper, it may be added by spraying or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the above process. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The above-described water-soluble derivatives obtained by treatment with agents such as sulfur dioxide and alkali metal bisulfite may be reacted with alkali to form new polyhydroxy polycarboxylic acids or salts. This is accomplished by suspending or dissolving the polymer derivative into a solution of basic material which has a dissociation constant greater than $2.0\times 10^{-5}$. The basic materials used in the reaction are preferably the alkali metal hydroxides, alkaline earth metal hydroxides, strong amines, ammonium hydroxide and the like. Preferred materials are the water-soluble hydroxides and basic salts of the alkali metals as sodium, potassium, lithium and ammonium hydroxide and basic salts. The pH of the reaction mixture preferably is between 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to the OH and carboxyl groups. Theoretically, one mol of caustic is needed for every two aldehyde groups converted. To obtain a high degree of conversions, such as 70 to 90% conversion, solutions of higher normality should be employed, while for the lower conversions lower normality may be utilized.

The temperature employed in the reaction with the alkali may vary over a wide range. Preferred temperatures range from about 0° to 60° C.

In most cases, the polyme derivative will dissolve in the alkaline medium in a few minutes and the reaction should be complete in the matter of a few hours. Reaction times generally vary from about 20 minutes to about 50 hours.

At the conclusion of the reaction, the hydroxy-polycarboxylic acid derivative may be recovered in salt form by evaporation, crystallization and the like, or the reaction mixture may be treated with an acid to recover the product as the polyhydroxy polycarboxylic acid rather than the corresponding salt. This is accomplished by merely adding acids, such as hydrochloric, sulfuric or the like, in dilute form to the mixture until the product precipitates. This is at a pH of about 3 to 5. The precipitate is then preferably washed and dried.

The resulting hydroxy carboxylic acids prepared as above will vary from thick liquids to solids. They are useful as cross-linking agents for polyepoxides, and in the formation of new ester and salt derivatives.

Salts of the polymeric hydroxy carboxylic acids, and preferably the ammonia, alkali metal or alkaline earth metal salts, are valuable as dispersing agents and emulsifying agents, as soil conditioners, self-polishing waxes, dry and wet strength agents for paper, sizing agents for paper and textile fibers, crease and shrink-proofing agents for textiles and the like.

To illustrate the manner in which the invention may be carried out, the following examples are given. It is to be understood, however, that the examples are for the purpose of illustration, and the invention is not to be regarded as limited to any of the specific conditions recited therein.

*Example I*

This example illustrates the unexpected superior results obtained by polymerization of the unsaturated aldehydes by using high energy ionizing radiation and an acidic medium.

(A) Acrolein was added to water to form a 20% solution. Phosphoric acid was then added to form a 1% solution and .2% of nonylphenol-ethylene oxide added as an anti-coalescent agent. This mixture was then placed in a glass reactor and the air swept out with nitrogen. The reactor was sealed and exposed to X-rays at a temperature of 25° C. The dose rate was $1.2 \times 10^6$ rads per hour with a total dosage of $2.4 \times 10^6$ rads. At the conclusion of the exposure time, the reactor was opened and the solution filtered to remove the white solid polymer. There was a 73% conversion to polymer. The resulting polymer was a white powder having an intrinsic viscosity (as determined on the sulfur dioxide solubilized product) of .7 dl./g. The polymer was insoluble in water and solvents, such as benzene and acetone, but dissolved in aqueous sulfur dioxide and sodium bisulfite.

A 2% water solution of the $SO_2$-solubilized polymer was prepared and sheets of bleached sulfite paper passed into and through the solution. The treated sheets were then pressed out on dry paper and allowed to dry at room temperature. The resulting product had the appearance, feel and flexibility of the untreated paper, but demonstrated unexpected improvement in fold endurance, dimensional stability, and resistance to hydrolysis and improvement in wet strength.

(B) The above experiment was repeated with the exception that the reaction medium did not contain any rad. In this case, the polymer obtained was insoluble in aqueous sulfur dioxide and sodium bisulfite.

*Example II*

Example IA was repeated with the exception that the dosage was $3.5 \times 10^6$ rads instead of $2.4 \times 10^6$ rads. In this case, the conversion was 90.5%. The polymer was still a high molecular weight product which was soluble in aqueous sulfur dioxide and sodium bisulfite.

*Example III*

Acrolein was added to 500 parts of water to form a 20% solution and sulfuric acid added to form a 1% solution. .1% of nonylphenol-ethylene oxide adduct was added as an anti-coalescent agent. This mixture was then placed in glass reactor, the air swept out with nitrogen, the reactor sealed and exposed to an X-ray beam at 25° C. The dose rate was $2.1 \times 10^6$ rads/hour and the total dosage was $1.0 \times 10^6$ rads. At the conclusion of the exposure time, the reactor was opened and the solution filtered to remove the white solid polymer. The resulting polymer was a white powder having an intrinsic viscosity (as determined on the sulfur dioxide solubilized product) of 1.1 dl./g. The polymer was insoluble in water and solvents, such as benzene and acetone, but was dissolved in aqueous sulfur dioxide and sodium bisulfite.

A 2% water solution of the $SO_2$-solubilized polymer was prepared and sheets of bleached sulfite paper into and through the solution. The treated sheets were then pressed out on dry paper and allowed to dry at room temperature. The resulting product had the appearance, feel and flexibility of the untreated paper, but demonstrated unexpected improvement in fold endurance, dimensional stability, and resistance to hydrolysis and improvement in wet strength.

*Example IV*

Acrolein was added to water to form a 20% solution. Sulfuric acid was then added to form a .1% solution and .2% nonylphenol-ethylene oxide adduct added as above. This mixture was then placed in an ampoule and the container degassed and sealed off. The sealed ampoule was then tumbled end-over-end and exposed to X-ray beam. The dose rate was $7 \times 10^6$ rads per hour with a total dose of $2.3 \times 10^6$ rads per hour. At the conclusion of the exposure time, the ampoule was opened and the solution filtered to remove the white solid polymer. There was a 58% conversion to polymer. The resulting product was a white powder having an intrinsic viscosity of 1.0 dl./g. The polymer was insoluble in water and solvents, such as benzene and acetone, but dissolved in aqueous sulfur dioxide and sodium bisulfite.

*Example V*

Example IV was repeated with the exception that the acid concentration was .01%. Related results are obtained.

*Example VI*

Examples IA to V are repeated with the exception that the aqueous medium was irradiated by exposure to spent uranium reactor fuel elements. In each case, the desired high molecular weight solid polymer of acrolein was obtained.

*Example VII*

Examples IA to V are repeated with the exception that the temperature employed was 50° C. Related results are obtained.

Example VIII

Example IA is repeated with the exception that the acrolein is replaced with methacrolein. Related high molecular weight solid polymers are obtained.

Example IX

Examples IA to VIII are repeated with the exception that the aqueous medium is exposed to high energy protons and to X-rays. Related results are obtained.

Example X

Examples IA to III are repeated with the exception that the acrolein is replaced by a mixture of 80 parts acrolein and 20 parts ethyl acrylate. A high molecular weight solid copolymer is obtained.

Example XI

Example I was repeated with the exception that the acid employed was p-toluenesulfonic acid. Related results are obtained.

Example XII

Acrolein was added to 500 parts of water to form a 10% solution and phosphoric acid added to form a 1% solution. .2% of nonylphenol-ethylene oxide was added as an anti-coalescent agent. This mixture was then placed in a glass reactor, the air swept out with nitrogen and the reactor sealed and exposed to an X-ray beam at 25° C. The dose rate was $1.2 \times 10^6$ rads per hour and the total dose was $2.4 \times 10^6$ rads. At the conclusion of the exposure time the reactor was opened and the solution filtered to remove the white solid polymer. The resulting polymer was a white powder having a high molecular weight. Conversion was 70%.

Example XIII

Acrolein was added to 500 parts of water to form a 30% solution and phosphoric acid added to form a 1% solution. .2% of nonylphenol-ethylene oxide adduct was added. This mixture was place in a glass reactor, the air swept out with nitrogen and the reactor sealed and exposed to an X-ray beam at 25° C. The dose rate was $1.8 \times 10^6$ rads per hour with a total dose of $3.6 \times 10^6$ rads. At the conclusion of the exposure time the reactor was opened and the solution filtered to remove a white solid polymer. There was a 92% conversion to a polymer intrinsic viscosity of 1.52 dl./g.

Example XIV

Acrolein was added to 500 parts of water to form a 20% solution and phosphoric acid added to form a 1% solution. .2% of nonylphenol-ethylene oxide adduct was added. This mixture was placed in a glass reactor and the air swept out with nitrogen and the reactor was sealed and exposed to an X-ray beam at 25° C. The dose rate was $1.8 \times 10^4$ rads with a total dose of $7.2 \times 10^4$. The resulting polymer had an intrinsic viscosity of 1.9 dl./g, G value was 12,700.

Example XV

Acrolein was added to 500 parts of water to form a 20% solution and phosphoric acid added to form a 1% solution, .25% of nonylphenol-ethylene oxide adduct was added. This mixture was placed in a glass reactor, the air swept out with nitrogen and the reactor sealed and exposed to an X-ray beam at 0° C. for two hours. The dose rate was $1.2 \times 10^6$ rads with a total dose of $2.4 \times 10^6$ rads. There was a conversion of 82% to polymer. The product was a high molecular weight polymer having an intrinsic viscosity of 1.17 dl./g.

We claim as our invention:

1. A process for polymerizing ethylenically unsaturated aldehydes to form high molecular weight polymers which comprises exposing an aqueous medium containing from .001% to 20% acid and the unsaturated aldehyde to $10^5$ to $10^8$ rads of high energy ionizing radiation.

2. A process for polymerizing alpha,beta-ethylenically unsaturated monoaldehydes which comprises exposing an aqueous medium containing from .001% to 20% acid and the unsaturated aldehyde to $10^5$ to $10^8$ rads of high energy ionizing radiation at a temperature between 0° C. and 100° C.

3. A process as in claim 2 wherein the unsaturated aldehyde is acrolein.

4. A process as in claim 2 wherein the unsaturated aldehyde is methacrolein.

5. A process as in claim 2 wherein the process is conducted in an inert atmosphere.

6. A process as in claim 2 wherein the aqueous medium is exposed to an electron beam.

7. A process as in claim 2 wherein the aqueous medium is exposed to high energy protons.

8. A process as in claim 2 wherein the monomer is exposed to X-rays.

9. A process for polymerizing acrolein to form a high molecular weight polymer which is soluble in aqueous $SO_2$ and sodium bisulfite which comprises exposing an aqueous medium containing .001% to 20% acid and 1% to 50% acrolein to $10^5$ to $10^8$ rads of high energy ionizing radiation at a temperature between 10° C. and 50° C.

10. A process as in claim 9 wherein the acid is sulfuric acid.

11. A process as in claim 9 wherein the acid is phosphoric acid.

12. A process as in claim 9 wherein the acid is p-toluene-sulfonic acid.

13. A process as in claim 9 wherein the aqueous medium contains a non-ionic surface active agent.

14. A process as in claim 9 wherein the aqueous medium contains a nonyl-phenol-alkylene oxide adduct as a surface-active agent.

References Cited in the file of this patent

UNITED STATES PATENTS

| | | |
|---|---|---|
| 2,326,736 | Alderson et al. | Aug. 17, 1943 |
| 2,657,192 | Miller et al. | Oct. 27, 1953 |

OTHER REFERENCES

Henglein et al.: Die Makromolekular Chemie, volume 31 (March 20, 1959), pages 181–191.